(12) United States Patent
Hobgood et al.

(10) Patent No.: US 9,407,613 B2
(45) Date of Patent: *Aug. 2, 2016

(54) MEDIA ACCELERATION FOR VIRTUAL COMPUTING SERVICES

(75) Inventors: Andrew W. Hobgood, Marlborough, MA (US); Steve Baron, Nashua, NH (US); Clinton B. Battersby, Norwood, MA (US)

(73) Assignee: VMware, Inc., Palo Alto, CA (US)

( * ) Notice: Subject to any disclaimer, the term of this patent is extended or adjusted under 35 U.S.C. 154(b) by 262 days.

This patent is subject to a terminal disclaimer.

(21) Appl. No.: 13/461,380

(22) Filed: May 1, 2012

(65) Prior Publication Data

US 2012/0213294 A1    Aug. 23, 2012

Related U.S. Application Data

(63) Continuation of application No. 12/424,314, filed on Apr. 15, 2009, now Pat. No. 8,170,123.

(60) Provisional application No. 61/045,025, filed on Apr. 15, 2008.

(51) Int. Cl.
*H04N 7/26* (2006.01)
*H04L 29/06* (2006.01)
*H04N 21/414* (2011.01)
(Continued)

(52) U.S. Cl.
CPC ............. *H04L 63/08* (2013.01); *H04L 63/02* (2013.01); *H04L 63/0281* (2013.01); *H04L 65/602* (2013.01); *H04L 65/607* (2013.01); *H04L 67/08* (2013.01); *H04N 21/4143* (2013.01); *H04N 21/41407* (2013.01)

(58) Field of Classification Search
None
See application file for complete search history.

(56) References Cited

U.S. PATENT DOCUMENTS 6,175,867 B1   1/2001   Taghadoss
6,536,043 B1   3/2003   Guedalia
6,615,357 B1   9/2003   Boden (Continued)

FOREIGN PATENT DOCUMENTS

EP        1259084 A1      11/2002
EP        2 357 763        8/2011
WO     2013134439 A2     9/2013

OTHER PUBLICATIONS

Office Action in U.S. Appl. No. 12/424,247 mailed Apr. 17, 2012.
(Continued)

*Primary Examiner* — Hung Dang
*Assistant Examiner* — Sunghyoun Park

(57) ABSTRACT

Streaming media is problematic for thin clients using remoting protocols like RDP that were never designed to handle the volume of data associated with multimedia. The result is large demands on the host computer and thin client CPU and excessive bandwidth on the network, which results in a poor display quality. A process running on a host computer detects an existing multimedia acceleration channel to a thin client and also identifies unaccelerated media streams like Adobe Flash. The unaccelerated content is automatically re-encoded using a codec format supported by the thin client acceleration channel. This results in a significant improvement in the quality of the streaming media displayed on the thin client and overall reductions in host CPU load, network bandwidth and thin client CPU load. No additional software is required on the thin clients to support new media types including Adobe Flash.

18 Claims, 3 Drawing Sheets

(51) Int. Cl.
*H04N 21/4143* (2011.01)
*H04L 29/08* (2006.01)

(56) References Cited

U.S. PATENT DOCUMENTS

| | | | |
|---|---|---|---|
| 7,516,255 B1 | 4/2009 | Hobbs | |
| 7,590,750 B2 | 9/2009 | Adbo | |
| 7,948,922 B2 | 5/2011 | Pang | |
| 8,014,308 B2 | 9/2011 | Gates | |
| 8,170,123 B1 | 5/2012 | Hobgood | |
| 8,281,377 B1 | 10/2012 | Snow | |
| 8,307,362 B1 | 11/2012 | Gong | |
| 8,725,886 B1 | 5/2014 | Pulier et al. | |
| 8,959,338 B2 | 2/2015 | Snow et al. | |
| 2002/0069369 A1 | 6/2002 | Tremain | |
| 2003/0135578 A1 | 7/2003 | Banga | |
| 2005/0091359 A1* | 4/2005 | Soin | G09G 5/006 709/223 |
| 2006/0002315 A1* | 1/2006 | Theurer et al. | 370/261 |
| 2006/0031225 A1 | 2/2006 | Palmeri | |
| 2006/0053212 A1* | 3/2006 | Lin | G09G 5/006 709/217 |
| 2006/0090136 A1 | 4/2006 | Miller | |
| 2006/0203007 A1* | 9/2006 | Bullard et al. | 345/619 |
| 2007/0097130 A1* | 5/2007 | Margulis | G06F 3/1431 345/501 |
| 2007/0162945 A1 | 7/2007 | Mills | |
| 2007/0162968 A1 | 7/2007 | Ferreira | |
| 2007/0220168 A1* | 9/2007 | Parsons et al. | 709/246 |
| 2007/0226762 A1 | 9/2007 | Girgis | |
| 2008/0013916 A1 | 1/2008 | Sharpe | |
| 2008/0043764 A1 | 2/2008 | Ishizaki | |
| 2008/0080396 A1 | 4/2008 | Meijer | |
| 2008/0080552 A1 | 4/2008 | Gates | |
| 2008/0170622 A1 | 7/2008 | Gordon | |
| 2008/0232472 A1* | 9/2008 | Kwon | H03M 13/356 375/240.13 |
| 2008/0240122 A1 | 10/2008 | Richardson | |
| 2008/0267187 A1 | 10/2008 | Kulmala | |
| 2008/0301566 A1 | 12/2008 | Abdo | |
| 2008/0313278 A1 | 12/2008 | Hochberg | |
| 2009/0144393 A1 | 6/2009 | Kudo | |
| 2009/0177996 A1 | 7/2009 | Hunt | |
| 2009/0178006 A1 | 7/2009 | Lemay | |
| 2009/0248869 A1 | 10/2009 | Ghostine | |
| 2010/0037310 A1 | 2/2010 | Turley | |
| 2011/0090911 A1 | 4/2011 | Hao | |
| 2011/0119390 A1 | 5/2011 | Leech et al. | |
| 2011/0142053 A1 | 6/2011 | Van Der Merwe | |
| 2012/0213294 A1 | 8/2012 | Hobgood | |
| 2013/0174242 A1 | 7/2013 | Snow | |
| 2013/0235874 A1 | 9/2013 | Ringdahl | |
| 2015/0058967 A1 | 2/2015 | Ringdahl | |

OTHER PUBLICATIONS

Office Action in U.S. Appl. No. 12/424,314 mailed Aug. 4, 2011.
Office Action in U.S. Appl. No. 13/632,202 mailed Aug. 2, 2013.
Search report in PCT patent application PCT/US2013/029462 mailed Oct. 16, 2013.
Unpublished U.S. Appl. No. 13/191,037, filed Jul. 26, 2011.
First Office Action in U.S. Appl. No. 13/191,037, mailed Jan. 10, 2013.
Second Office Action in U.S. Appl. No. 13/191,037, mailed Oct. 28, 2013.
Unpublished U.S. Appl. No. 13/974,774, filed Aug. 23, 2013.
"MPLS/BGP Virtual Private Networks", 13 pages, copyright 2002, Spirent plc.
"Virtual Routing", Version 1.21-r5, copyright 2005, Interpeak AB.
"MPLS VPN—VRF Selection Based on Source IP Address". 18 pages, Cisco IOS Release 12.0(22)S, dated 2007.
Third Office Action in U.S. Appl. No. 13/191,037, mailed Mar. 26, 2014.
Fourth Office Action in U.S. Appl. No. 13/191,037, mailed Oct. 2, 2014.
Fifth Office Action in U.S. Appl. No. 13/191,037, mailed Apr. 10, 2015.
First Office Action in U.S. Appl. No. 13/413,867, mailed Apr. 8, 2015.
Office Action in U.S. Appl. No. 13/974,774, mailed Jul. 16, 2015.
Notice of Allowance in U.S. Appl. No. 13/632,202, mailed Jul. 10, 2014.
Interpeak Secure Networking Software, "Virtual Routing" Bringing TCP/IP to a New Level, 2005.

* cited by examiner

MEDIA ACCELERATION FOR VIRTUAL COMPUTING SERVICES

RELATED APPLICATIONS

This patent application claims the benefit under 35 U.S.C. §119(e) of the disclosure of U.S. Provisional Patent Application No. 61/045,025, filed Apr. 15, 2008, entitled "VIRTUAL DESKTOP OPTIMIZATIONS INCLUDING REMOTE ACCESS, MULTIMEDIA ACCELERATION, MULTI-TENANT DATA CENTER DESIGN, AND POOL MANAGEMENT," incorporated herein by reference.

BACKGROUND

Modern enterprises expend substantial capital to maintain an IT infrastructure. A significant percentage of the expenditure stems from equipping individual users with dedicated computing resources in the form of desktop computers. There is a nearly universal mandate in corporations, governments and academic institutions to better control the escalating costs and complexity of managing desktops in large numbers and across widely disparate geographies. In addition, most companies continue to deploy traditional physical desktop computers running at less than 10% capacity, resulting in enormous waste of time, money and energy. In the computer realm, there is a continuing shift from initial deployment costs to ongoing maintenance costs. Traditionally, a computing infrastructure was marked with substantial up-front costs due to the high cost of computing hardware and memory resources. However, with the ongoing trend of reduced costs for computing hardware, and the converse trend of increased compensation for skilled personnel to support and maintain computer systems, a typical enterprise spends more to maintain a user then the cost to initially outfit the user.

Consistent with this view of reducing IT infrastructure costs, a provisioning approach that selectively provides users with only the computer services they need for a predetermined interval is more cost effective than outfitting each user with a largely idle PC. Early computing environments implemented a "mainframe" computing approach that allowed user access to the mainframe from a terminal device that performed only input and output. A multiprogramming operating system on the mainframe performed rapid context switching between a multitude of users to give each user the impression that the mainframe computer was dedicated to that user. Each user shared the memory, disk storage, and CPU capabilities for usage of the installed applications, giving each user a similar user experience. The mainframe was generally accessed from local terminals via a so-called "front end", or via telecommunications lines that were specific to a facility or dedicated POTS (plain old telephone service) voice lines, thus consuming expensive dedicated lines (i.e. not packet switched) for each remote user.

The modern equivalent of this paradigm is often referred to as Thin Client computing as opposed to the more conventional deployment of thick clients that have CPU, memory and storage and execute all of the software locally. The thin clients are the local rendering devices operated directly by the user, and appear similar to a conventional desktop or laptop. Modern desktop computing practice, however, often incorporates various forms of multimedia content that must be displayed on the user device, whether thick or thin. Such multimedia forms typically invoke a variety of encoding and compression mechanisms for efficient transmission and rendering over local and wide area networks. Multimedia content presents significant challenges based on the limited set of computing resources and software available on a typical thin client to provide robust coverage of the multitude of media forms.

SUMMARY

Streaming media has become an increasingly popular method of delivering various combinations of video and audio to desktop computers. Since streaming media, particularly of a high quality or resolution, tends to be very large, various transformations are employed to reduce the transmission bandwidth required for streaming media. Media encoding and compression is typically performed to repackage the streaming media, for transmission and subsequent rendering on a display device by applying the complementary (inverse) encoding and decompression operations. Appropriate selection of efficient encoding transformations can reduce bandwidth by an order of magnitude or more, identification and application of optimal encoding and compression operations greatly improves performance and reduces transmission costs.

In a virtual computing environment such as that described in copending U.S. patent application Ser. No. 11/875,297, filed Oct. 19, 2007, entitled "PROVISIONED VIRTUAL COMPUTING", incorporated herein by reference, users receive computing services through a local computing device coupled via a network connection to a computing services provider. The local computing device may be a thin client having minimal computational resources, in order to reduce deployment cost while shifting the computing load to the computing services provider. By equipping the thin client with only the required display, communication and user I/O capabilities, many thin clients are deployable for network connection to a server providing the requested computing services. Configurations herein leverage the computing resources available in the thin clients for multimedia transmission by identifying decoding and decompression capabilities available in the thin client, and redirecting media streams to preserve or substitute encoding and compression schemes for consistency with the capabilities of the thin client.

The virtual computing environment therefore facilitates user provisioning by deploying a minimal set of computing hardware to each user and structuring computing services from a server to each user according to a best fit model that neither over provisions nor under provisions each user. The minimal hardware deployment effected by the local thin client device (local display device) employs a network connection to the computing services provider, typically a server and associated equipment for providing computing services, as described in the copending application cited above. The local display device generally performs I/O and display operations while deferring computing operations to the server, thus relying on the network connection to transport the results of requested output. In the case of bandwidth intensive streaming media, the CPU and rendering limitations of the local display device become significant. Selection of optimal encoding and compression, which includes availability of compatible codecs at the local rendering device, can greatly affect the rendering performance.

In a thin client computing environment, streaming media is typically rendered on a host computer and then transported over a network using protocols like RDP that were never designed to handle the volume of graphical data associated with streaming media. The result is a large demand on the host computer CPU, excessive bandwidth on the network and large demands on the limited CPU resources of the thin client.

The net result is poor video and audio quality on the thin client. Several vendors developed extensions to RDP to redirect multimedia content based on Microsoft DirectShow to the thin client to improve efficiency. However, this only works with DirectShow compatible applications like Windows Media Player and does not accelerate QuickTime and Flash content.

A process running on the host computer automatically detects the presence of an existing multimedia acceleration channel to the thin client and also identifies unaccelerated media streams like Adobe Flash. The unaccelerated content is re-encoded using a codec format supported by the thin client acceleration channel. This results in a significant improvement in the quality of the streaming media displayed on the thin client and overall reductions in host CPU load, network bandwidth and thin client CPU load. No additional software is required on the thin clients to support new media types including Adobe Flash.

In a particular configuration, RDP, a network remoting protocol, is used to connect the local display devices to the server for receiving virtual computing services. Various vendor supplied implementations may be employed. A major shortcoming to existing remote graphical desktop presentation protocols (such as Microsoft's Remote Desktop Protocol [RDP] or Citrix® Systems' ICA) is that they were originally optimized to encode and transmit Windows® desktop applications over low bandwidth network connections. As such, they operate at the Windows GDI (Graphics Device Interface) layer and were not optimized for highly graphical content and multimedia including full motion video. The result is that these protocols fails to deliver adequate frame rates, synchronization and interactivity when presenting content that cannot be rendered directly by GDI, including rich multimedia and full motion video.

Typically, when using an RDP or ICA connection, any rich media content is decoded and then rendered to a region on the virtual screen as a bitmap. Each time this bitmap region is updated, the remoting protocol transmits a new version of the region to the thin client. Each transmission of a change to the region is treated as separate graphical image, similar to a slide-show, without the benefit of video codecs for encoding and decoding the content. This process results in visual artifacts, low frame rates, and loss of synchronization between audio and video. Some content, such as Adobe Shockwave and Flash media, render their combined vector and raster content to a bitmap region, circumventing standard GDI window and drawing calls. The bitmap region is then encoded and transmitted as above, and suffers the same quality degradation.

In order to overcome the multimedia limitation of the RDP and ICA remoting protocols, several thin client vendors including Wyse and Sun developed protocol extensions that improve multimedia quality by redirecting the original stream directly to the thin client. This requires software on the host as well as software on the thin client to decode and render the multimedia stream. A common implementation is to install a DirectShow FilterGraph on the host that negotiates an acceleration channel between the host and the thin client. While this approach works well, it only accelerates a limited number of applications layered on top of Microsoft DirectShow framework including Microsoft Windows Media Player. Rich multimedia content from popular applications including Apple QuickTime and Adobe Flash and Shockwave are not accelerated.

Accordingly, configurations herein substantially overcome the shortcomings of rich multimedia content that is not compatible with DirectShow by re-encoding the media stream with a DirectShow compatible FilterGraph. This FilterGraph negotiates with existing thin client acceleration to select codecs that are available at the remote rendering device. Once a matching codec is found, the original media stream which was rendered into bitmap format on the host, is re-encoded and transmitted to the rendering device at a significant reduction in bandwidth and CPU overhead on both the host and the thin client.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
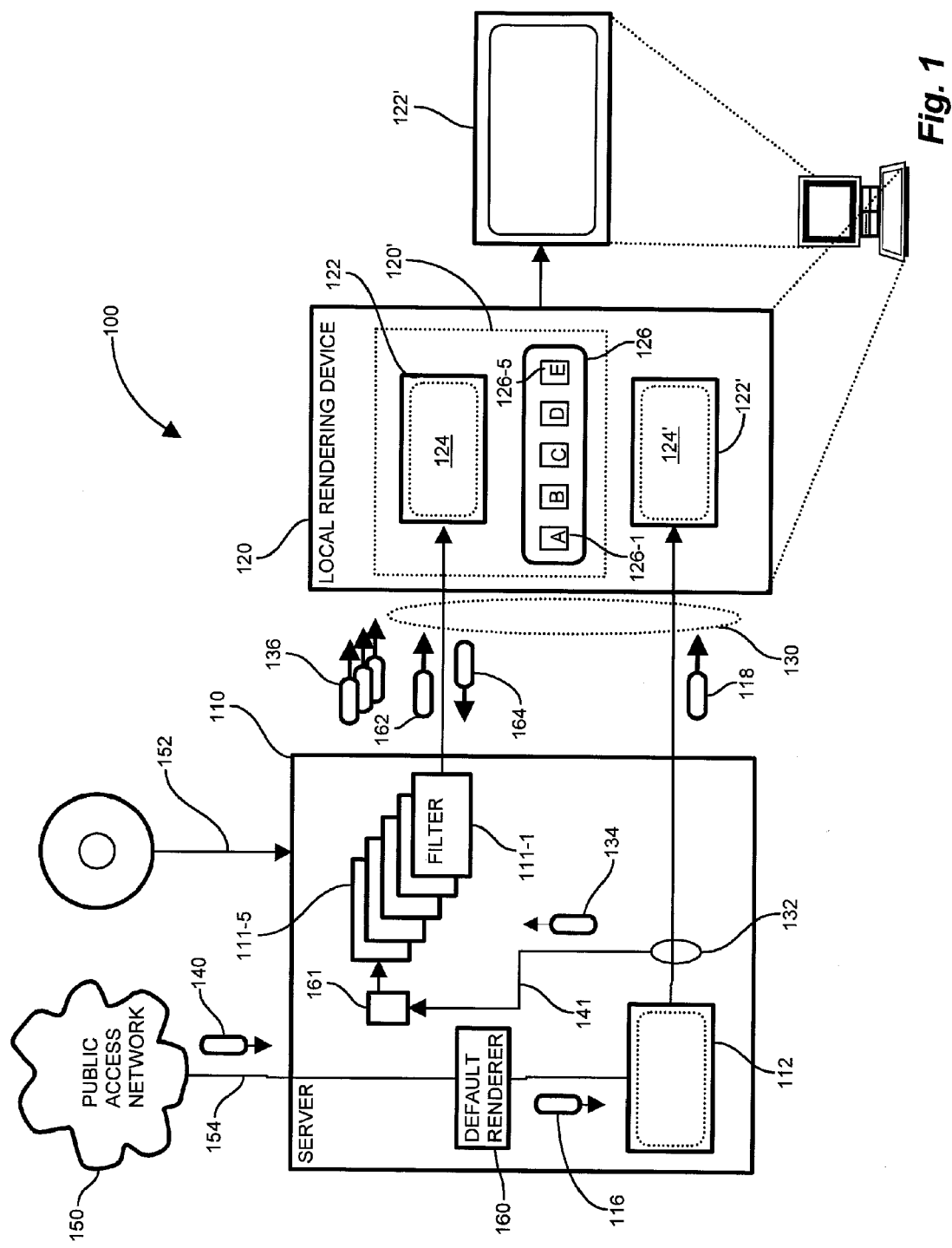
FIG. 1 is a context diagram of an exemplary computing environment suitable for use with the media acceleration framework disclosed herein.

Conventional media stream rendering suffers from the shortcoming that the operation of rendering the graphical data onto a visual display device typically employs an uncompressed bitmap format that consumes excessive bandwidth when using remoting protocols like RDP and ICA. Configurations disclosed herein are based, in part, on the observation that much more efficient encoding could be leveraged to reduce the size and improve the efficiency of processing and transmitting rendered multimedia content to a remote display device.

Stream media processing often takes the form of one or more filters applied to the stream of data. The filters transform the data into encoded and/or compressed forms that occupy less space. A series of filters may be applied such that each reduces the size of the data (and thus the transmission bandwidth), and the reverse operation applied to transform the stream and render the transported media onto a display device, typical an audio visual monitor.

As the selected filters may not necessarily interoperate in series, and not all filters may be available in all contexts, streaming media may be transformed into a less than optimal form for transmission. For example, a bitmap (2 dimensional pixel) representation is a straightforward (i.e. less complex to process), although memory intensive representation, particularly for higher resolutions. Conventional methods transform rich media in the form of combined raster and vector data to a renderable bitmap form, and then transport the large bitmaps as separate and unrelated blobs of data. Rendering streaming video from such a transformation tends to result in a low frame rate, thus a "jumpy" picture, low resolution, and image dropout. Accordingly, configurations herein substantially overcome the shortcomings of using existing remoting protocols to transmit rendered bitmaps regions by identifying the content as rich media and using appropriate codecs available on both the host and the remote device to encode, transmit and decode the rendered media content.

Various configurations may be arranged to perform media acceleration to a thin client rendering device as disclosed above. In particular, client software and device vendors have developed software components to redirect encoded media streams (such as MPEG video or Windows Media Video formats, as are known in the art) directly to a client device, skipping the remote decoding and re-encoding step, and then rendering the encoded media stream locally on the client. One such vendor is Wyse Technology, of San Jose, Calif. This preserves the original media encoding (including time stamps on video and audio samples, thereby preserving A/V synchronization), as well as increasing visual quality, frame rate, interactivity, and substantially lowering resource consumption on the computer hosting the remote desktop session. Often, the implementation of this technology leverages existing OS video processing functionality (specifically, Microsoft® DirectShow).

Such an approach works well for pre-compressed media streams (such as video clips), but does not solve the problem that exists for application software that render to a bitmap region on the screen (such as Adobe Shockwave and Flash). Since these are inherently uncompressed streams that are rendered directly to screen, the acceleration and redirection technologies that would typically operate on a DirectShow video stream are unable to process the bitmap stream, and therefore unable to redirect it to the client device for local rendering.

One solution to this problem is to encapsulate the application (in this case, a Flash .swf movie) in a software wrapper that intercepts rendering calls to the GDI bitmap device context and audio output interface. This wrapper can then internally timestamp the video and audio samples, and output them using standard DirectShow APIs. The result is a "source filter" that runs the Flash movie and outputs a standard audio/video stream. This stream can then be redirected using existing rich-media redirection filters that use the DirectShow API.

Another solution is to allow the application (again, a Flash .swf movie) to be rendered in-place in a browser or on the desktop with no software wrapper. A process can then search the windowing system to locate the movie, obtain the bitmap device context to which the movie is rendering and capture the contents. It could also watch the audio output device on the system for output coming from the Flash player process, and capture the audio stream. The results can then be timestamped and redirected as above.

An additional way to improve the performance of the redirection is to perform compression on the audio/video stream that is passed to the third-party redirection component. Some redirection components automatically detect which compressed formats are supported by the client device, and will transcode any raw input stream into a compressed stream for transmission. However, in some cases this compression will be too resource intensive and inefficient for the host device, or the results will be inadequate for the particular kind of media. By processing the stream externally before passing it to the redirection component, this solution maintains control over what compression is used and what kind of bandwidth/quality tradeoffs are appropriate for the content being redirected.

Additionally, some redirection components do not require a DirectShow API input, but require some other API. Obviously, once a capture or wrapper component is written to intercept the bitmap rendering call within the operating system, the output can be customized to the input requirements for any rich-media redirection technology.

FIG. 1 is a context diagram of an exemplary computing environment suitable for use with the media acceleration framework disclosed herein. Referring to FIG. 1, the managed information environment 100 includes a server 110 coupled to a local rendering device 120. The coupling is defined by a network connection 130, which may include additional nodes, routing and security measures such as those disclosed in copending U.S. patent application Ser. No. 12/424,247, filed concurrently, entitled REMOTE ACCESS MANAGER FOR VIRTUAL COMPUTING SERVICES. In the configuration shown, the server 110 provides virtual computing services to the local rendering device 120 through the connection 130. Such computing services include streaming media 140 emanating from a public access network 150 or other suitable mechanism, such as a direct connection 152 to the server 110. Conventional rendering mechanisms may direct the streaming media 140 to a default renderer 160 for transmission to and rendering on the local rendering device 120.

As discussed above, the default renderer 160 suffers from the shortcoming that it may perform transformations and encoding that require excessive bandwidth, degrading the rendered image 124' on a rendering screen 122' responsive to the local rendering device 120. The default renderer 160 may, for example, render the incoming media stream 140 to an intermediate bitmap 112. The incoming media stream 140 typically includes encoded image data (i.e. voice and video) that is decoded prior to transformation to the intermediate bitmap 112. The intermediate bitmap 112 does not actually display an image 114, but rather decodes and stores the image data 116, usually raster and vector based display data, into a bitmap as an intermediate rendering format. The resulting conventional bitmap data 112, now more voluminous than its encoded counterpart 140, is reencoded and transmitted as bitmap packets 118 to the local rendering device 120 for rendering (i.e. display) on the rendering screen 122'. The resulting image 124' thus requires complete transmission of an entire conventional bitmap frame for each rendered frame of video, resulting in jumpy images and slow progression.

Configurations herein identify the encoded packets 140 in the stream 154 having directly renderable media for intermediate bitmap rendering, and redirect the packets 141 to a filter 111-1 . . . 111-5 (111, generally) for retransmission to the local rendering device 120. The server 110 identifies or traps a call 132 for transmission of the bitmap rendering, and redirects the encoded packet 134 to one or more filters 111. The filters redirect the stream 141 directly to the local rendering device 120 by identify codecs 126 available at the local rendering device 120, determine an appropriate filter or filter 111 sequence 111-N for encoding each packet 134 and transmitting the packet as a filtered stream 136 to the rendering device 120 without incurring frame by frame transmission of the intermediate bitmap rendering or other inefficient reencoding mechanism. An interceptor 161 receives the call 132 for rendering, and sends a codec discovery message 162 to the rendering device 120 to evoke a codec response 164 to indicate the codecs 126-1 . . . 126-5 (126 generally) available for decoding the filtered stream 136. The filtered stream 136, which may include reencoding depending on the codec response 164, generates a rendered image 124 on the display screen 122 of the rendering device 120.

As described in the copending application disclosed above, the local rendering device 120 is typically a thin client 120' responsive to the server 110 for receiving virtual computing services. The thin client 120' includes a set of codecs 126, depending, in part, on the vendor supplied configuration of the particular thin client 120. A variety of suitable devices may operate as a thin client 120' responsive to the server 110. In the example shown, the thin client 120' includes codecs A, B, C, D, and E (126-1 . . . 126-5), responsive respectively to filters 111-1 . . . 111-5. The codec discovery 162 and codec response 164 identify common codecs between the server 110 and rendering device 120. In this manner, a variety of compatible codecs may be invoked between the interceptor 161 and the rendering screen 124 for transforming the stream 140 of directly renderable content which preserves compression and optimization in the media stream 140 while avoiding full bitmap rendering and serial frame reencoding which requires retransmission of every frame (i.e. each pixel) as bitmap packets 118.

Figure 2:
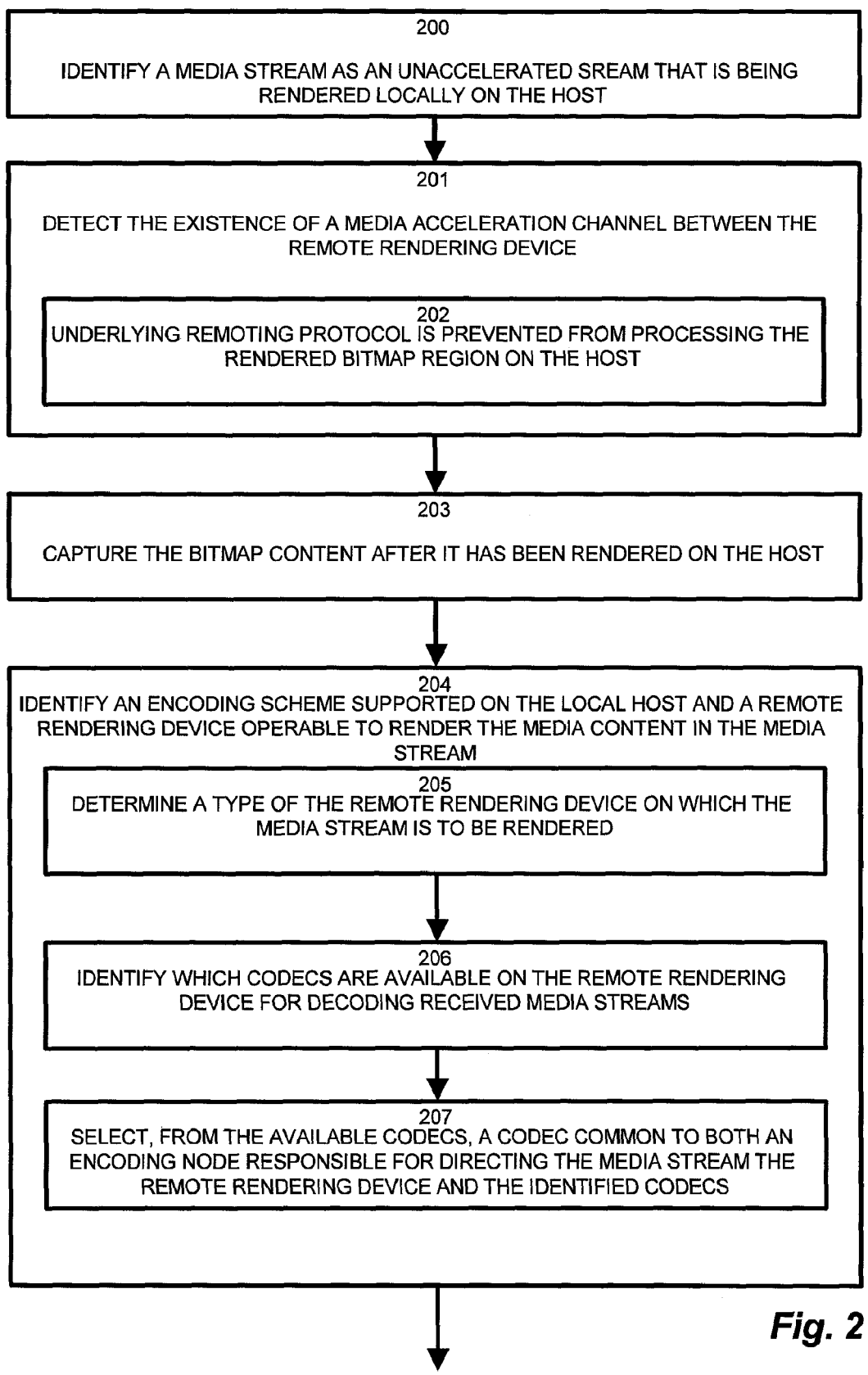
FIGS. 2 and 3 are a flowchart of media acceleration in the computing environment of FIG. 1.
Figure 3:
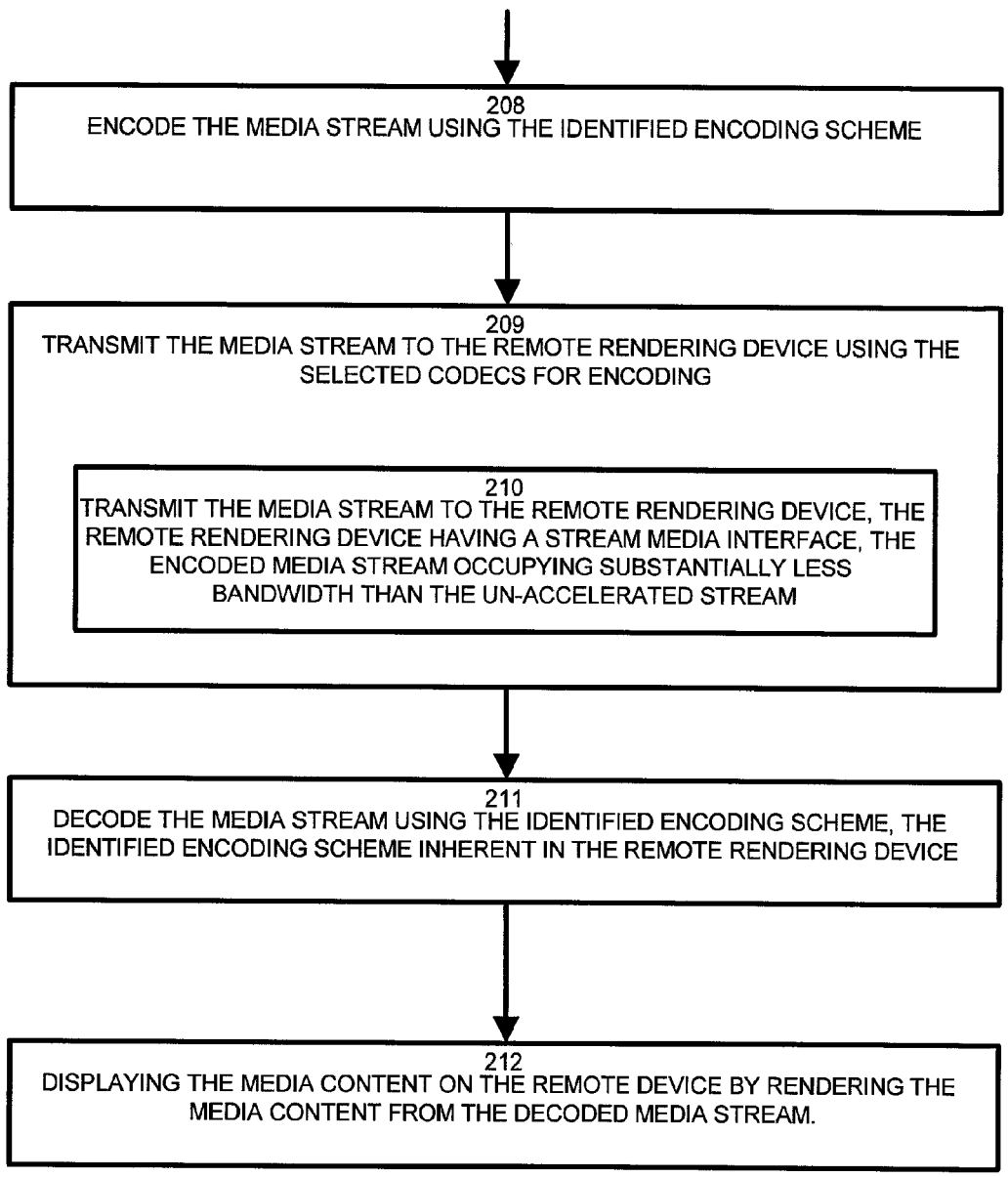

FIGS. 2 and 3 are a flowchart of media acceleration in the computing environment of FIG. 1. Referring to FIGS. 1-3, the method for transmitting bandwidth intensive media streams between a local host 110 (server) and a local rendering device 120 as disclosed herein includes identifying a media stream as an unaccelerated stream that is being rendered locally on the host, as depicted at step 200. Typical encoding schemes reduce the bandwidth needed for transmission provided that there are complementary encoding/decoding capabilities on the corresponding transmission endpoints. The server 110 detects the existence of a media acceleration channel between the remote rendering device 120, as shown at step 201. Such a media acceleration channel is for taking advantage of encoding codecs at the local rendering device 120 to improve performance of transmitted media streams 136. In configurations herein, shortcomings with the available encoding formats impose that the underlying remoting protocol is prevented from processing the rendered bitmap region 112 on the host (server) 110, as clarified at step 202. The rendered bitmap region 112 is employed as an intermediate rendered format for reencoding to the local rendering device 120. Since the incoming stream 140 includes various forms (i.e. vector and raster data), intermediate rendering ensures that the resulting transmitted image stream 136 is complete. However, incompatibilities with encoding schemes employ the default renderer 160 for the bitmapped intermediate rendering format 112, and then reencoded the bitmap in a sequential frame by frame 118 form, thus redundantly redrawing the entire screen 124' each frame.

Accordingly, the interceptor 161 identifies the bitmap output 118 and captures the bitmap content after it has been rendered on the host, as depicted at step 203. The interceptor 161 identifies an encoding scheme supported on both the local host 110 (server) and the remote rendering device 120 operable to render the media content in the media stream 136, as disclosed at step 204. This includes, at step 205, determining a type of the remote rendering device 120 on which the media stream 136 is to be rendered, and identifying which codecs 126 are available on that type of remote rendering device 120 for decoding received media streams 136, as depicted at step 206. The interceptor 161 then selects, from the available codecs 126, a codec common to both an encoding node (i.e. server 110) responsible for directing the media stream to the remote rendering device using the identified codecs, as shown at step 207.

The server 110 encoding the media stream 141 using the identified encoding scheme and corresponding filters 111, as shown at step 208, and transmitting the media stream 136 in the reencoded form to the remote rendering device 120 using the selected codecs 126 for encoding. Therefore, the server 110 transmits the media stream 136 to the remote rendering device 120 in which the remote rendering device has a stream media interface such that the encoded media stream 136 occupies substantially less bandwidth than the un-accelerated stream 118, as depicted at step 210.

The receiving local rendering device 120 then decodes the media stream 136 using the identified encoding scheme, since the identified encoding scheme is inherent in the remote rendering device 120, as shown at step 211. the local rendering device displays the media content on the remote device by rendering the media content from the decoded media stream 136, as disclosed at step 212. Particular features of the disclosed configuration include relieving the server 110 and the local rendering device of the bitmap reencoding, which provides a substantial performance benefit to CPU on the host (server) and on the client 120. The codec to encode video is generally much more efficient than individual bitmap optimizations. The available frame rate over bitmap encoding is about a tenfold improvement, which avoids a "jumpy" picture as is common with conventional bitmap rendering schemes. Similarly, the improved frame rate results from a lessened bandwidth requirement, thus mitigating about a tenfold improvement in bandwidth consumed. In a typical thin client often employed with such a virtual terminal server 110, the thin client rendering operations benefit from reduced bandwidth and lower CPU requirement when using codec to decode and render video. Further, the reencoding avoids the problem of license incompatibilities which can result in the bitmap reencoding due to a lack of codec compatibility of agreement between the server 110 and the thin client (local rendering device 120). Those skilled in the art should readily appreciate that the programs and methods for media acceleration in a virtual computing services environment as defined herein are deliverable to a user processing and rendering device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for media acceleration in a virtual computing services environment has been particularly shown and described with references to embodiments thereof, it will be understood by those skilled in the art that various changes in form and details may be made therein without departing from the scope of the invention encompassed by the appended claims.

What is claimed is:

1. A method for transmitting a media stream between a local host and a remote rendering device comprising:

transmitting desktop information between the local host and the remote rendering device using a first channel using a remoting protocol;

identifying an uncompressed media stream that is being rendered on the local host, wherein the media stream is being rendered with the desktop information transmitted using the remoting protocol;

capturing bitmap content for the identified media stream after the media stream has been rendered on the local host, wherein the capturing prevents a remoting protocol from processing the rendered bitmap content for transmission to the remote rendering device, and wherein the capturing includes intercepting calls to render the identified media stream as bitmap content;

encoding the identified media stream using an encoder configured to encode streaming media and supported on both the local host and the remote rendering device, wherein encoding includes encapsulating the bitmap content in a software wrapper; and transmitting the encoded media stream to the remote rendering device using a second channel comprising a media acceleration channel associated with the remoting protocol to cause the encoded content of the media stream to be decoded and displayed with the desktop information at the remote rendering device.

2. The method of claim 1 further comprising identifying the encoding scheme, by:
receiving information identifying codecs available on the remote rendering device; and
selecting, from the available codecs, a codec common to both the local host and the remote rendering device.

3. The method of claim 1 wherein encoding the identified media stream further comprises identifying one or more filters and invoking the identified one or more filters for encoding the identified media stream.

4. The method of claim 3 where the remote rendering device does not have native support for the identified media stream.

5. The method of claim 1 wherein the local host comprises a virtual desktop running in a virtual machine.

6. The method of claim 1 wherein the identified media stream is uncompressed and adapted for bitmap rendering, the method further comprising:
applying a timestamp to the encapsulated bitmap content; and
outputting the encapsulated bitmap content as an uncompressed media stream to the remote rendering device.

7. The method of claim 1 wherein outputting the encapsulated bitmap content further comprises invoking a filter on the encapsulated bitmap content.

8. A computer system, comprising:
a local host hosting a desktop environment, including a remoting protocol for transmitting a rendered desktop between the local host and a remote rendering device on a first channel over a computer network, the remoting protocol having an associated second channel including a media acceleration channel supporting an encoder configured to encode a media stream on the local host, the local host being configured to:
identify the media stream for the rendered desktop that is being rendered on the local host wherein the media stream is being rendered with the rendered desktop transmitted using the remoting protocol;
capture bitmap content for the identified media stream after the media stream has been rendered on the local host, wherein the capture prevents a remoting protocol from processing the rendered bitmap content for transmission to the remote rendering device, and wherein the capturing includes intercepting calls to render the identified media stream as bitmap content;
encode the identified media stream using the encoder configured to encode streaming media and supported by the remote rendering device, wherein encoding includes encapsulating the bitmap content in a software wrapper;
transmit desktop information between the local host and the remote rendering device using the first channel using the remoting protocol; and
transmit the encoded media stream to the remote rendering device using the media acceleration channel associated with the remoting protocol to cause the remote rendering device to decode and display the encoded content of the media stream with the desktop information.

9. The computer system of claim 8, wherein the local host is further configured to identify the encoding scheme.

10. The computer system of claim 9, wherein, to identify the encoding scheme, the local host is further configured to:
receive information identifying codecs available on the remote rendering device; and
select, from the available codecs, a codec common to both the local host and the remote rendering device.

11. The computer system of claim 8 wherein the local host comprises a virtual desktop running in a virtual machine.

12. The computer system of claim 8 wherein the identified media stream is uncompressed and adapted for bitmap rendering, and the local host is further configured to:
apply a timestamp to the encapsulated bitmap content; and
output the encapsulated bitmap content as an uncompressed media stream to the remote rendering device.

13. The computer system of claim 8, wherein to output the encapsulated bitmap content, the local host is further configured to invoke a filter on the encapsulated bitmap content.

14. A computer program product, comprising:
nontransitory computer readable storage including computer program instructions stored in locations on the computer readable storage for processing by a local host, wherein the local host hosts a desktop environment including a remoting protocol for transmitting a rendered desktop between the local host and a remote rendering device on a first channel over a computer network, wherein the remoting protocol has an associated second channel including a media acceleration channel supporting an encoder configured to encode streaming media, wherein the local host includes the encoder, wherein the local host, when processing the computer program instructions, is configured to:
identify a media stream for the rendered desktop that is being rendered on the local host, wherein the media stream is being rendered with the rendered desktop transmitted using the remoting protocol;
capture bitmap content for the identified media stream after the media stream has been rendered on the local host, wherein the capture prevents the remoting protocol from processing the rendered bitmap content for transmission to the remote rendering device, and wherein the capturing includes intercepting calls to render the identified media stream as bitmap content;
encode the identified media stream using the encoder configured to encode streaming media and supported by the remote rendering device, wherein encoding includes encapsulating the bitmap content in a software wrapper;
transmit desktop information between the local host and the remote rendering device using the first channel using the remoting protocol; and
transmit the encoded media stream to the remote rendering device using the media acceleration channel associated with the remoting protocol to cause the remote rendering device to decode and display the encoded content of the media stream with the desktop information.

15. The computer program product of claim 14, wherein the local host is further configured to identify the encoding scheme.

16. The computer program product of claim 15, wherein, to identify the encoding scheme, the local host is further configured to:
receive information identifying codecs available on the remote rendering device; and
select, from the available codecs, a codec common to both the local host and the remote rendering device.

17. The computer program product of claim 14 wherein the local host comprises a virtual desktop running in a virtual machine.

18. The computer program product of claim 14 wherein the identified media stream is uncompressed and adapted for bitmap rendering, and the local host is further configured to:
 apply a timestamp to the encapsulated bitmap content; and
 output the encapsulated bitmap content as an uncompressed media stream to the remote rendering device.

* * * * *